(12) United States Patent
Wei

(10) Patent No.: US 10,222,574 B2
(45) Date of Patent: Mar. 5, 2019

(54) OPTICAL LENS

(71) Applicant: Chuandong Wei, Shenzhen (CN)

(72) Inventor: Chuandong Wei, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 136 days.

(21) Appl. No.: 15/417,214

(22) Filed: Jan. 26, 2017

(65) Prior Publication Data

US 2018/0164532 A1    Jun. 14, 2018

(30) Foreign Application Priority Data

Dec. 10, 2016   (CN) .................. 2016 2 1353522 U

(51) Int. Cl.
  *G02B 7/02* (2006.01)
  *G02B 5/00* (2006.01)
  *G02B 13/18* (2006.01)

(52) U.S. Cl.
  CPC ............. *G02B 7/021* (2013.01); *G02B 5/005* (2013.01); *G02B 13/18* (2013.01)

(58) Field of Classification Search
  CPC .......... G02B 7/02; G02B 7/021; G02B 7/025; G02B 5/003; G02B 5/005
  See application file for complete search history.

(56) References Cited

U.S. PATENT DOCUMENTS

2009/0268315 A1* 10/2009 Chou ................ G02B 7/023
                                                                359/819
2016/0370579 A1* 12/2016 Cho ................. G02B 27/0018

* cited by examiner

*Primary Examiner* — William R Alexander
*Assistant Examiner* — Ephrem Z Mebrahtu
(74) *Attorney, Agent, or Firm* — Na Xu; IPro, PLLC

(57) ABSTRACT

The present disclosure provides an optical lens including a lens barrel, a lens group and a metal light shading component accommodated in the lens barrel, the lens barrel includes a first barrel wall and a second barrel wall which is bended and extends from the first barrel wall, the first barrel wall has a first light aperture, the lens barrel has an adhesive accommodating slot, which is filled with a magnetic adhesive for absorbing the metal light shading components. Based on an optical lens of the prior art, the metal light shading component is provided, and further the adhesive accommodating filled with a magnetic adhesive is provided to fix the metal light shading component via magnetic force. Such assembly is detachable, such that the components can be assembled section by section, so as to further facilitate the assembly process and improve imaging effect of the optical lens.

6 Claims, 3 Drawing Sheets

OPTICAL LENS

TECHNICAL FIELD

The present disclosure relates to the field of optical devices and, particularly, relates to an optical lens.

BACKGROUND

In recent years, portable electronic devices have been developing rapidly, for example, smart electronic devices and tablet computers, etc. have been wildly used in modern people's life, and optical lenses which are installed on the portable electronic devices are also developing accordingly. With the advancement of technologies, the requirements by users on imaging quality of the optical lenses are becoming higher and higher. The optical lens of the prior art is mainly composed of a lens barrel and lenses, the lens barrel has a light aperture and thus presents a tube-like shape, the lenses are assembled in the interior of the lens barrel, during assembling, the lenses must be assembled one by one in a specific assembling sequence and then the lens group is positioned in the interior of the lens barrel via a locking ring. However, such optical lens will generate stray light therein.

BRIEF DESCRIPTION OF DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to make objectives, technical solutions and advantages of the present disclosure clearer, embodiments of the present disclosure are illustrated in detail with reference to the accompanying drawings. However, it should be understood by those skilled in the art that, a plurality of details provided in embodiments of the present disclosure are merely for better understanding of the present disclosure. The technical solution which each claim of the present application seeks to protect can also be realized even without these technical details and various changes and modifications based on the following embodiments.

Figure 1:
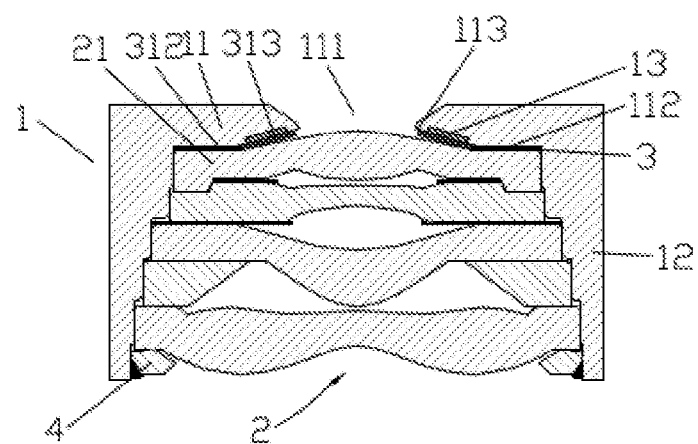
FIG. 1 is a structural schematic diagram of an optical lens in accordance with an exemplary embodiment.
Figure 2:
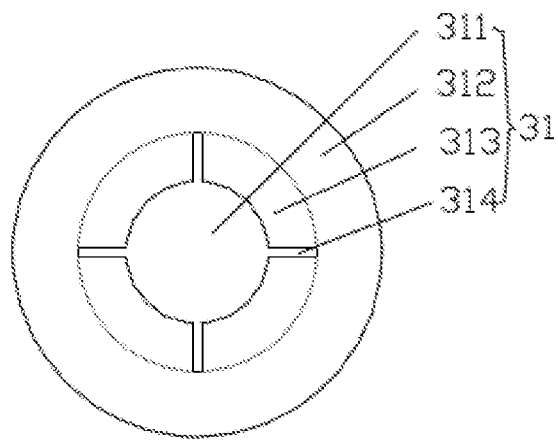
FIG. 2 is a top view of a metal light shading sheet in accordance with an exemplary embodiment.
Figure 3:
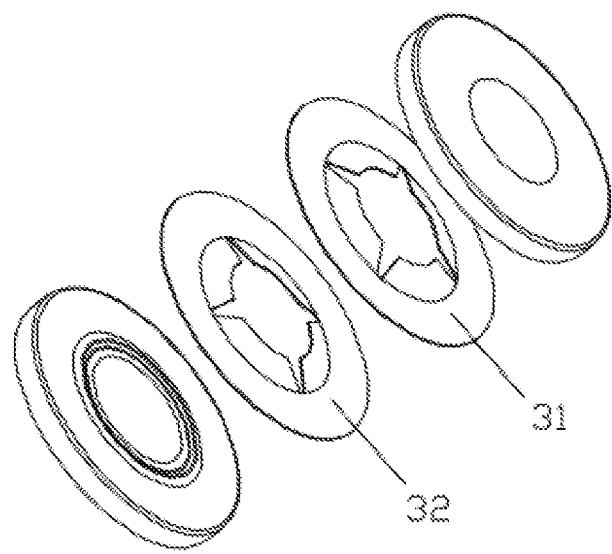
FIG. 3 is an exploded schematic diagram of an assembly structure of a metal light shading sheet.

An exemplary embodiment of the present disclosure relates to an optical lens, as shown in FIG. 1, the optical lens includes a lens barrel 1 and a lens group 2 and a metal light shading component 3 accommodated in the lens barrel 1, the lens barrel 1 includes a first barrel wall 11 and a second barrel wall 12 which is bended and extends from the first barrel wall 11, the first barrel wall 11 has a first light aperture 111, the lens barrel 1 is shaped as a circular tube and is provided with an adhesive accommodating slot 13, the adhesive accommodating slot 13 is filled with a magnetic adhesive for absorbing the metal light shading component 3, the magnetic adhesive can be any type of the prior art. The lens group 2 is arranged in the interior of the lens barrel 1 and is composed of a plurality of lenses arranged by stacking, a locking piece 4 for providing supporting force is provided below the lens group 2 so as to prevent the lenses from falling off. The diameter of the metal light shading component 3 matches an inner diameter of the lens barrel 1 or may be slightly smaller than the inner diameter of the lens barrel 1, and the metal light shading component 3 is embedded in the interior of the lens barrel 1 and is absorbed to the magnetic adhesive via magnetic force, or can be interpreted as being absorbed at an notch of the adhesive accommodating slot 13, the metal light shading component 3 and one lens are abutted against each other.

It is readily seen from the above contents that, additional metal light shading components 3 are provided based on the optical lens of the prior art, and an adhesive accommodating slot 13 filled with a magnetic adhesive is provided, which can fix the metal light shading components 3 via magnetic force. Such assembly structure is detachable, such that the components can be assembled section by section, so as to further facilitate the assembly process. Generally, marginal areas after matting treatment and the optical imaging portion will form a segment gap therebetween, such segment gap will cause stray light, which causes that the edge of the field of view suddenly brightens, however, positions where the metal light shading components 3 are absorbed could be without the matting treatment, so as to improve the imaging effect of the optical lens.

Specifically, in the present embodiment, the lens group 2 includes a first lens 21, and the metal light shading component 3 is clamped between the first barrel wall 11 and the first lens 21. The metal light shading component 3 receives supporting force from the first barrel wall 11 and the first lens 21 and thus has a stable structure.

In the present embodiment, the first barrel wall 11 has a lower surface opposite to the first lens 21, and the adhesive accommodating slot 13 is arranged at the lower surface of the first barrel wall 11. In this way, the metal light shading component 3 is located at the position of the light aperture for supplementing the light aperture, such that the phenomenon that the light aperture generates stray light due to insufficient roundness can be avoided.

It should be noted that, in the present embodiment, a projection of the adhesive accommodating slot 13 on the lens barrel 1 presents a closed ring, and central axes of the adhesive accommodating slot 13 and the lens barrel 1 overlap with each other. In this way, contacting area between the magnetic adhesive and the metal light shading component 3 is increased and thus the magnetic force is increased, so that the connection of the metal light shading component 3 is more stable. It should also be understood that, similar effect can also be realized if the projection of the adhesive accommodating slot 13 on the lens barrel 1 presents other shapes, such as arc.

It should be noted that, the lower surface in the present embodiment includes a connecting surface 112 which is connected with the second barrel wall 12 and an extending surface 113 which is bended and extends from the connecting surface 112 toward a direction far away from the lens group 2, the adhesive accommodating slot 13 is arranged at the extending surface 113 of the first barrel wall 11, the extending surface 113 in the figures slightly tilts upward and forms a partial gap from the lens group 2. The metal component deforms after being absorbed and is tightly attached onto the extending surface 113. In the present embodiment, the metal light shading component 3 includes a first metal light shading sheet 31 which has a second light aperture 311, and the first metal light shading sheet 31 is a thin sheet formed by impact molding; the first metal light shading sheet 31 includes a first body portion 312 which is abutted with the connecting surface 112 of the first barrel wall 11 and a first raised portion 313 which is bended and extends from the first body portion 312 toward a direction far away from the lens group 2, the first raised portion 313 is connected with the magnetic adhesive.

Figure 4:
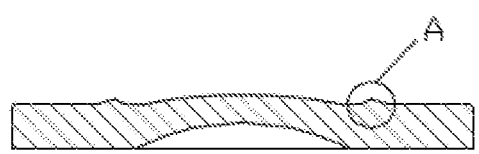
FIG. 4 is a structural schematic diagram of a lens with a surface being raised.
Figure 5:
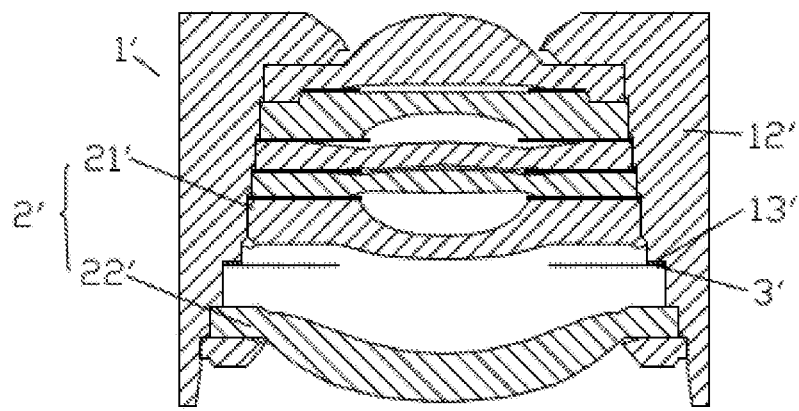
FIG. 5 is a structural schematic diagram of an optical lens in accordance with another exemplary embodiment.
Figure 6:
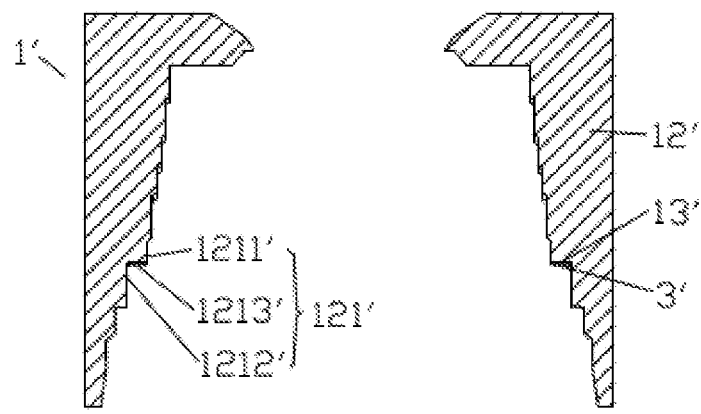
FIG. 6 is a structural schematic diagram of a lens barrel in accordance with another exemplary embodiment.

Further, the metal light shading component 3 further includes at least one second metal light shading sheet 32 which has a third light aperture, and the structure of the second metal light shading sheet 32 is basically the same as that of the first metal light shading sheet 31 and thus, specifically, please see the description of the first metal light shading sheet 31; the second metal light shading sheet 32 includes a second body portion which is arranged between the first metal light shading sheet 31 and the first lens 21 and is abutted with the first lens 21, and a second raised portion which is bended and extends from the second body portion toward a direction far away from the lens group 2, the first raised portion 313 has a plurality of first notches 314, the second raised portion has a plurality of second notches, projections of the first notches 314 in a direction of an optical axis of the lens group 2 are located on the second metal light shading sheet 32, and projections of the second notches in a direction of an optical axis of the lens group 2 are located on the first metal light shading sheet 31. Due to the deformability of metal, the metal light shading sheets with notches can be bended to a certain degree, such that the metal light shading sheets can be stacked on the lenses which have raised portions (such as position A in FIG. 4) on the surfaces, and be assembled in a manner that two light shading sheets are staggered with a certain angle, so as to fully shade the lenses except the aspherical surfaces of the lenses. As shown in the figures, the first notches 314 are communicated with the second light aperture 311, and the second notches are communicated with the third light aperture, so as to facilitate molding.

Another exemplary embodiment of the present disclosure relates to an optical lens. The present embodiment is basically the same as the previous embodiment except the following main differences: in the previous embodiment, the adhesive accommodating slot is arranged at the lower surface of the first barrel wall, however, in the present embodiment, the adhesive accommodating slot 13' is arranged at an internal surface of the second barrel wall 12', such that the metal light shading component 3' can be fixed at any position in the lens barrel 1' to shade light for any lens in the lens group 2', so as to improve the imaging effect of the optical lens.

It should be noted that, in the present embodiment, the internal surface has a ladder portion 121', the ladder portion 121' includes: a first ladder ring surface 1211', a second ladder ring surface 1212' and a perpendicular surface 1213', the perpendicular surface 1213' is connected with the first ladder ring surface 1211' and the second ladder ring surface 1212', respectively; central axes of the first ladder ring surface 1211' and the second ladder ring surface 1212' overlap with each other, and a diameter of the first ladder ring surface 1211' is smaller than a diameter of the second ladder ring surface 1212'; the perpendicular surface 1213' is perpendicular to the central axes; and the adhesive accommodating slot 13' is provided on the perpendicular surface 1213'. The ladder portion 121' plays a role of fixing the position of the metal light shading component 3' and thus makes the connection of the metal light shading component 3' more firm. The lens group 2' includes a first lens group 21' and a second lens group 22' successively from an object side to an image side, and the ladder portion 121' is located between the first lens group 21' and the second lens group 22', so as to realize the separation of the first lens group 21' from the second lens group 22' and improve imaging effect.

It should be noted by the person skilled in the art that, the above are merely embodiments of the present disclosure, based on which, various changes in forms and details can be made without departing from the spirit and scope of the present disclosure.

What is claimed is:

1. An optical lens, comprising:
    a lens barrel, the lens barrel comprises a first barrel wall and a second barrel wall which is bended and extends from the first barrel wall, the first barrel wall has a first light aperture;
    a lens group accommodated in the lens barrel; and
    a metal light shading component accommodated in the lens barrel,
    wherein the lens barrel is provided with an adhesive accommodating slot, the adhesive accommodating slot is filled with a magnetic adhesive for attracting the metal light shading component, the lens group comprises a first lens, and the metal light shading component is clamped between the first barrel wall and the first lens, the first barrel wall has a lower surface opposite to the first lens, and the adhesive accommodating slot is arranged at the lower surface of the first barrel wall, the lower surface comprises a connecting surface which is connected with the second barrel wall and an extending surface which is bended and extends from the connecting surface toward a direction far away from the lens group, the adhesive accommodating slot is arranged at the extending surface of the first barrel wall.

2. The optical lens as described in claim 1, wherein the metal light shading component comprises a first metal light shading sheet which has a second light aperture, the first metal light shading sheet comprises a first body portion which is abutted with the connecting surface of the first barrel wall and a first raised portion which is bended and extends from the first body portion toward a direction far away from the lens group, the first raised portion is connected with the magnetic adhesive.

3. The optical lens as described in claim 2, wherein the metal light shading component further comprises at least one second metal light shading sheet which has a third light aperture, the second metal light shading sheet comprises a second body portion which is arranged between the first metal light shading sheet and the first lens and is abutted with the first lens, and a second raised portion which is bended and extends from the second body portion toward a direction far away from the lens group, the first raised portion has a plurality of first notches, the second raised portion has a plurality of second notches, projections of the first notches in a direction of an optical axis of the lens group are located on the second metal light shading sheet, and projections of the second notches in a direction of an optical axis of the lens group are located on the first metal light shading sheet.

4. The optical lens as described in claim 3, wherein the first notches are communicated with the second light aperture, and the second notches are communicated with the third light aperture.

5. An optical lens, comprising:
- a lens barrel, the lens barrel comprises a first barrel wall and a second barrel wall which is bended and extends from the first barrel wall, the first barrel wall has a first light aperture;
- a lens group accommodated in the lens barrel; and
- a metal light shading component accommodated in the lens barrel,
- wherein the lens barrel is provided with an adhesive accommodating slot, the adhesive accommodating slot is filled with a magnetic adhesive for attracting the metal light shading component, the adhesive accommodating slot is arranged at an internal surface of the second barrel wall, the internal surface has a ladder portion, the ladder portion comprises: a first ladder ring surface, a second ladder ring surface and a perpendicular surface, the perpendicular surface is connected with the first ladder ring surface and the second ladder ring surface, respectively; wherein, central axes of the first ladder ring surface and the second ladder ring surface overlap with each other, and a diameter of the first ladder ring surface is smaller than a diameter of the second ladder ring surface; the perpendicular surface is perpendicular to the central axes; and the adhesive accommodating slot is arranged at the perpendicular surface.

6. The optical lens as described in claim 5, wherein the lens group comprises a first lens group and second lens group successively from an object side to an image side, and the ladder portion is located between the first lens group and the second lens group.

\* \* \* \* \*